Aug. 16, 1932.   C. D. DALLAS   1,871,666
AIR RING
Filed Aug. 26, 1931

Witness:
William P. Kilroy

Inventor:
Charles D. Dallas
Hill & Hill
Attys

Patented Aug. 16, 1932

1,871,666

UNITED STATES PATENT OFFICE

CHARLES D. DALLAS, OF CHICAGO, ILLINOIS, ASSIGNOR TO REVERE COPPER & BRASS INCORPORATED, OF ROME, NEW YORK, A CORPORATION OF MARYLAND

AIR RING

Application filed August 26, 1931. Serial No. 559,465.

The invention relates to nozzles of the kind generally known as air rings and more particularly it relates to nozzles adapted to produce a wiping action by directing compressed air upon the surface of the articles such as lock seam tubes following their immersion in a solder bath or their being otherwise coated with solder or similar material.

The invention has as one of its objects an improved air ring of the kind described so constructed as to cause solder to flow along the surface of a tube in such a manner as to fill the seam and to leave a thin film on the remaining portion of the tube.

Another object of the invention is the provision of an improved air ring of novel construction having a plurality of discharge slots of a shape adapting them to be self cleaning and to prevent clogging by the accumulation of dust and other foreign particles contained in the compressed air.

In lock seam tubes, there are some irregularities at the joint such as longitudinal depressions. The soldering process usually consists in passing the tube through a solder bath from which it emerges covered with a thin film of solder. It is desirable that the solder be concentrated along the seam to fill the same and the surplus solder be removed from the tube. The described concentration of the solder along the seam to fill the depressions and the removal of the surplus solder is equally desirable if the solder is applied by some other method than dipping.

Still another object of the invention is to provide a device of the kind described so constructed and arranged as to give a smooth finished appearance to the joints of lock seam tubes by causing the solder to flow in and fill depressions along the seams and by wiping the solder from the remaining portion of the tube.

The invention contemplates an air ring having an annular chamber connected with a central bore. Compressed air is delivered into the bottom of the chamber and escapes through slots arranged with angular symmetry about the bore. The air pressure in the annular chamber diminishes towards the top with the result that the driving or wiping action of the air discharged from the slots is less at the top than elsewhere. The freshly tinned or soldered tube is passed through the bore with the seam uppermost where the impact of the streams of air escaped from the slots have less driving or wiping action. The diminished driving action of the streams of air discharged from the top portion of the chamber tends not only to roll the solder along the tube longitudinally but also to roll the solder from the side towards the top where the impact or driving force of the escaping air is less.

The discharge slots are arranged to deliver air along the surface of the tube at an acute angle to the longitudinal axis of the tube. It has been found by experiment that the discharge of air along the surface of the tube at an angle of from 22 to 25 degrees to the longitudinal axis more effectively rolls the solder towards the seam and more completely wipes the solder from the tube than is the case where any greater or smaller angle of inclination is employed.

The invention further contemplates the provision in a device of the kind described of an annular manifold chamber through which compressed air flows and is discharged through a plurality of slots arranged in angular symmetry about the chamber, the connection of the slots with the chamber being such as to permit escape of air through the slots in a direction substantially perpendicular to the flow of the main current through the chamber. A further object of the invention is the provision of an improved air ring of the kind described so constructed as to minimize the retardation of the flow of the air through the chamber.

Still another object of the invention is to provide an air ring of the kind described which is simple, compact, convenient and satisfactory for its intended purpose.

Many other objects and advantages of the construction herein shown and described will be more obvious from the disclosures herein given.

To this end, my invention consists in the novel construction and arrangement herein shown and described and more particularly pointed out in the appended claims.

In the drawing, wherein like reference characters indicate like or corresponding parts:

Figs. 1 and 2 are sectional views through a device embodying the principles of my invention, Fig. 1 being a view along the line 1—1 of Fig. 2 and Fig. 2 being a view taken along the line 2—2 of Fig. 1;

Figure 1:
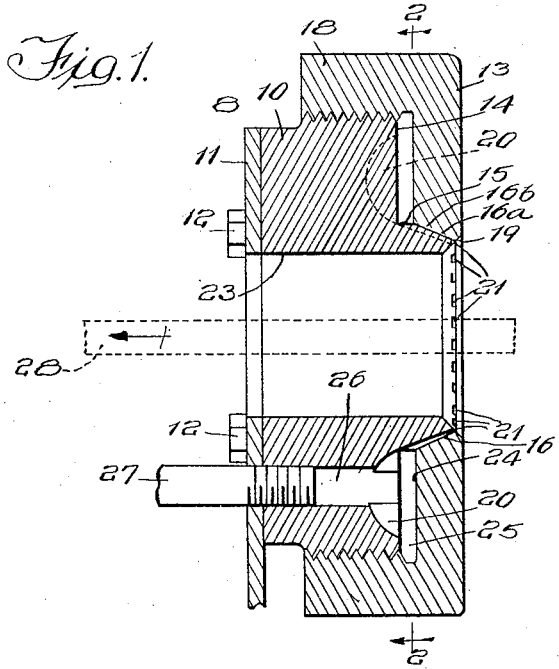
Figure 3:
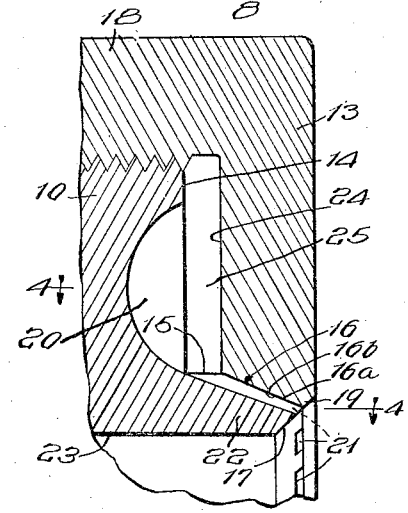
Fig. 3 is a view to a larger scale of a fragmentary portion of the device shown in Fig. 1.
Figure 2:
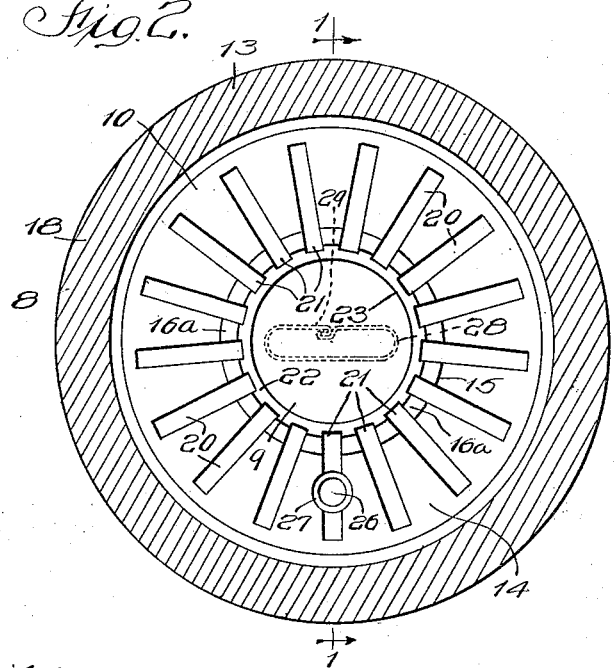
Figure 4:
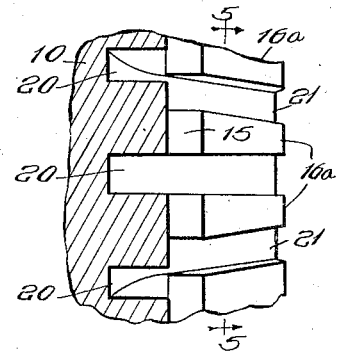
Fig. 4 is a view along the line 4—4 of Fig. 3.
Figure 5:
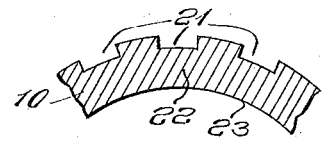
Fig. 5 is a view along the line 5—5 of Fig. 4.

Referring now more particularly to the drawing, the invention is shown as embodied in an air nozzle or ring generally designated by the numeral 8 and having a cylindrical bore 9 extending therethrough. The nozzle 8 is connected with a member 11 by bolts 12 and comprises a sleeve 10 and a cap member 13. The member 11 may be any suitable supporting member such as a wall of a vessel positioned to receive the surplus solder that may be blown from a tube 27 or similar article by the impact of air discharged by the device. The tube 27 is indicated by dotted lines and has a lock seam 28.

The cap member 13 has a flange 18 threaded onto the sleeve 10. The sleeve 10 has a frusto-conical projection 22 fitting against the cap member 13. The end of the sleeve 10 adjacent the cap member 13 is bounded by an annular surface 14, a narrow cylindrical surface 15 and a frusto-conical surface 16a, the latter closely fitting against a corresponding surface 16b on the cap member 13. The bore 9 is bounded by a cylindrical surface 23 terminating in a beveled surface 17. The cap member 13 has a beveled surface 19 aligned with the surface 17 to provide a guide for the tube 28 as it enters the bore 9.

The sleeve 10 and the cap member 13 when assembled provide an annular manifold chamber 25 between the inner face of the cap 13 and the sleeve surface 14. The chamber 25 is connected by a pipe 27 with a supply of compressed air (not shown), the air being delivered from the pipe into the bottom of the chamber through an opening 26. A plurality of grooves or slots 21 are formed in the frusto-conical portion 22 of the sleeve 10. The slots 21 are arranged in angular symmetry about the longitudinal axis of the bore 9 and, when the sleeve 10 and the cap member 13 are assembled as shown, provide outlets for the compressed air delivered into the chamber 25. The close fit between the surfaces 16a and 16b prevent escape of air from the slots 21 except at their outlet end. The slots 21 are of uniform width throughout their length with the top and bottom walls converging towards the outlet end. The cross sectional area of the slots being less at their outlet than at their discharge ends causes greater velocity of air at the outlet end of the slots than at the inlet end, and thereby prevents the accumulation of dust and other foreign particles which tend to stop or clop the outlet. The slots 21 terminate in the beveled surface 17 adjacent the peripheral surface 23 bounding the bore 9. The discharge ends of the slots 21 are close to the surface of the tube and as a result, the air is discharged at a uniform velocity upon the surface of the tube. The outer walls of the slots 21 are inclined to the longitudinal axis of the bore 9 at substantially an angle of 25 degrees and the inner walls of the slots are inclined to the axis of the tube at substantially an angle of 22 degrees. The convergence of the outer and inner walls is sufficient to cause a perceptible acceleration of velocity in the slots operable to prevent the clogging of the slots. The discharge of the air at the above mentioned angles upon the surface of the tube 28 is found, by experiment, to more effectively wipe the surface of the tube than when the inclination is either greater or less. The inner ends of the slots 21 each open into the inner surface of the annular chamber 25, the chamber being concentric with the axis of the bore 9 and the slots being arranged in angular symmetry relative to the bore and the chamber. The tube 28 is provided with a seam 29, the tube being advanced through the device with the seam at the top as shown.

The pipe 27 is connected with the bottom of the chamber 25 through the hole 26 so that the air flows upwardly on both sides of the chamber under diminished pressure as it rises by reason of the escape of air through the slots 21. The air flows from the slots 21 in a direction substantially perpendicular to the flow of air through the chamber 25.

It is found in practice that this cross flow tends to impede and make irregular the pressure within the chamber 25. In order that the retardation of and interference with the continuous flow of air through the chamber be minimized or prevented, a plurality of recesses 20 are provided in the sleeve 10 as shown. The recesses 20 are of the same width and are each aligned with one of the slots 21. The recesses 20 terminate opposite the chamber 25 in a curved bounding wall so arranged that the bottom wall of the slots has a smooth connection with the curved bounding surface of the recesses. The recesses 20 provide pockets tending to pick up air under a pressure substantially equal to the pressure of the air in the adjacent portion of the chamber 25. Pressure is maintained in the respective recesses 20 at a pressure substantially equal to that in the chamber 25 without retarding the even flow of air in the chamber for the reason that the depth of the recesses is substantially the depth of the chamber 25. The continuity of the curved bounding surface of the recesses with the inner wall of the slots permits air to flow freely from the recesses through the slots 21 with a minimum retardation or interference with the uniform flow of air through the chamber 25.

The driving force of the streams of air delivered by the slots 21, in the lower portion of the device, tends to wipe the solder from the lower surface of the tube 28 in advance of the wiping action occurring in the upper portion of the tube. The driving force and the resultant wiping action gradually diminishes upwardly to a minimum at the top. As a result, the streams of air striking the sides of the tube tend to roll the solder upwardly and towards the seam 29 thereby concentrating the solder in the seam and providing a smooth locking solder surface. The tube 25 in passing through the air ring is cleaned of surplus solder except at the seam 29 where the solder is concentrated and provides a leak proof seam.

Thus it will be seen that I have provided a novel air ring or nozzle operable to wipe a lock seam tube covered with solder in such a way as to fill the seam and to remove the solder leaving a film on the remaining portion of the tube, and also that I have provided a device wherein the air is delivered through a plurality of nozzles arranged in angular symmetry in such a way that the flow of air through the individual nozzles is uniform and the flow from the separate nozzles diminishes from a maximum on one side of the ring to a minimum on the other.

Having thus described the invention, it is obvious that various immaterial modifications may be resorted to without departing from the spirit of my invention; hence I do not wish to be understood as limiting myself to the exact form, construction and arrangement herein shown and described, or uses mentioned.

What I claim as new and desire to secure by Letters Patent is:

1. A wiper nozzle of the kind described comprising a member having a cylindrical bore extending therethrough, and an annular manifold chamber concentric with said bore, means connecting the chamber with a supply of gaseous fluid under pressure, said member having a plurality of discharge slots arranged with angular symmetry relative to said bore and terminating in the inner periphery of the manifold chamber, said slots converging inwardly at an acute angle to the axis of said bore, said member having a plurality of recesses opening into said annular chamber, each of said recesses being in alignment with and forming an extension of a slot.

2. A wiper nozzle of the kind described comprising a member having a cylindrical bore extending therethrough and an annular manifold chamber concentric with said bore, means connecting the chamber with a supply of compressed gaseous fluid, said member having a plurality of discharge slots connected with said chamber and arranged with angular symmetry relative to said bore, said slots being rectangular in cross section, the outer wall of each slot being inclined to the axis of the bore at approximately an angle of twenty five degrees and the inner wall of each slot being inclined to said axis at approximately an angle of twenty two degrees, said member having a plurality of recesses opening into said annular chamber in alignment with said slots, the width of said slots and recesses being equal and the edge wall of each recess being an extension of the bottom wall of the adjacent slot.

3. A wiper nozzle of the kind described comprising a member having a cylindrical bore extending therethrough and an annular manifold chamber concentric with said bore, means connecting the manifold chamber with a supply of compressed gaseous fluid, said member having a plurality of discharge slots converging towards and arranged with angular symmetry relative to said bore, the outer wall of said slots being inclined to the axis of the bore at an angle of approximately twenty five degrees, the inner wall of said slot being inclined to said axis at an angle of approximately twenty-two degrees, one end of each slot terminating in said annular chamber and the other end terminating near the end of said bore, said member having a plurality of recesses perpendicular to and opening into said annular chamber and forming extensions of said slots, the edge wall of said recesses opposite said chamber being curved.

4. A wiper nozzle of the kind described comprising a member having a cylindrical bore extending therethrough and an annular manifold chamber concentric with said bore, means connecting the manifold chamber with a supply of compressed gaseous fluid, said member having a plurality of discharge slots arranged with angular symmetry relative to said bore, said slots converging towards and inclined to the axis of the bore at an acute angle and each having one end terminating in said annular chamber and the other end terminating near the end of said bore, said member having a plurality of recesses perpendicular to and opening into said annular chamber and forming extensions of said slots, the edge wall of said recesses opposite said chamber being curved.

5. A wiper nozzle of the kind described comprising a member having a cylindrical bore extending therethrough and an annular manifold chamber concentric with said bore, means connecting the chamber with a supply of compressed gaseous fluid, said member having a plurality of discharge slots each connected with said chamber and converging toward said bore, said member having a plurality of recesses each perpendicular to and opening into said annular chamber in alignment with said slots, said slots being rectangular in cross section, the spacing of the outer and inner walls diminishing outwardly from the chamber, the width of said recess being the same as said slots and the edge wall of said recesses opposite said chamber being curved, said edge walls forming extensions of the inner wall of the connecting slots.

6. A wiper nozzle of the kind described comprising a member having a cylindrical bore extending therethrough and an annular manifold chamber concentric with said bore, means connecting the chamber with a supply of compressed gaseous fluid, said member having a plurality of discharge slots each connected with said chamber and arranged with angular symmetry relative to said bore, said slots converging towards and inclined to the longitudinal axis of the bore at an acute angle and each having one end terminating in said annular chamber and the other end terminating near the end of the bore, said member having a plurality of recesses each perpendicular to and opening into said annular chamber in alignment with said slots, said slots being rectangular in cross section, the spacing of the outer and inner walls diminishing outwardly from the chamber, the width of said recess being the same as said slots and edge walls of said recesses opposite said chamber being curved, said edge walls each forming an extension of the bottom wall of the aligned connecting slot.

7. A wiper nozzle of the kind described comprising a member having a cylindrical bore extending therethrough and an annular manifold chamber surrounding said bore, means connecting the manifold chamber with a supply of compressed gaseous fluid, said member having a plurality of discharge slots converging towards and inclined to the axis of the bore at an acute angle and each having one end terminating in said annular chamber and the other end terminating near the end of said bore, said member having a plurality of recesses opening into said annular chamber and forming extensions of said slots, the bottom and side walls of said slots being aligned with the corresponding walls of the adjacent recess.

In witness whereof, I hereunto subscribe my name this 7th day of August, A. D. 1931.

CHARLES D. DALLAS.